(12) United States Patent
Seelig

(10) Patent No.: US 6,407,470 B1
(45) Date of Patent: Jun. 18, 2002

(54) ELECTRIC POWER TRANSMISSION DEVICE

(75) Inventor: Anton Seelig, Flörsheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/530,020

(22) PCT Filed: Sep. 24, 1998

(86) PCT No.: PCT/EP98/06080
§ 371 (c)(1),
(2), (4) Date: Apr. 24, 2000

(87) PCT Pub. No.: WO99/22385
PCT Pub. Date: May 6, 1999

(30) Foreign Application Priority Data
Oct. 24, 1997 (DE) .......................................... 197 46 919

(51) Int. Cl.$^7$ .............................................. H01F 38/00
(52) U.S. Cl. ...................... 307/104; 307/9.1; 336/223; 191/10
(58) Field of Search ............................ 191/10; 307/104, 307/9.1; 336/223

(56) References Cited

U.S. PATENT DOCUMENTS 5,179,365 A * 1/1993 Raggi ........................... 336/65
5,293,308 A * 3/1994 Boys et al. .................... 363/37
5,619,078 A   4/1997 Boys et al.

FOREIGN PATENT DOCUMENTS

| DE | 44 46 779 A | 6/1996 |
| EP | WO 94 25304 A | 11/1994 |
| JP | 07067270 A | 3/1995 |
| JP | 07297058 A | 11/1995 |

* cited by examiner

Primary Examiner—Stephen W. Jackson
Assistant Examiner—Robert Deberadinas
(74) Attorney, Agent, or Firm—Venable; Norman N. Kunitz

(57) ABSTRACT

An electric power-transmission device having a primary conductor arrangement comprising at least two parallel primary conductors (PL) and at least one secondary winding arrangement that is electromagnetically coupled to the primary conductor arrangement, is mechanically separate from the primary conductor arrangement and can be moved in its longitudinal direction. The primary conductor arrangement and the secondary winding arrangement each comprise flat conductors having a small thickness ($d_L$) of a few millimeters and a large width side ($b_L$). The width sides of the primary conductors are disposed adjacently in one plane, and the secondary winding arrangement has at least one secondary coil (SS) that is embodied as a disk winding whose conductor width sides lie in one plane extends parrallel to the plane of the primary conductor arrangement.

15 Claims, 1 Drawing Sheet

ELECTRIC POWER TRANSMISSION DEVICE

BACKGROUND OF THE INVENTION

The invention relates to an electric power-transmission device.

In numerous transport operations, vehicles are moved on multiple-use, level traffic surfaces. It is known from DE-A-44 46 779 that the inductive transmission of electrical power into the 100-kW range from lines laid in the transport path to the vehicles via air gaps of more than 10 cm is possible. The application spectrum for the vehicles to be supplied without contact over the transport path encompasses, for example, small-container transport for files with powers in the 100-W range, unmanned transport systems in conveyor and assembly operations in the kW range, and goods and passenger transport vehicles with powers of 10 to over 100 kW. The use of traffic surfaces or the topology of the transport path with branches and intersections does not permit power-transmission devices to be mounted above the traffic surface, or openings in the traffic surface for a sub-surface power tap. The vehicles must therefore carry their drive power along in a battery. The used transmitters have U- or E-shaped transmitter heads that include a ferrite core and the transmission line.

A further energy-transmission device is known from, for example, JP 07-067 270 A. This device comprises a primary conductor arrangement that is laid in a transport path, and includes two parallel primary conductors and a secondary winding arrangement that is electromagnetically coupled thereto and is disposed on the floor of a vehicle. The secondary winding arrangement is formed by two adjacent coils of equal width that are connected to power converters, which feed DC voltages and direct currents into a battery. In this arrangement, a differential amplifier forms the difference between the output voltages of the power converters, and the deviation of the vehicle from the center of the primary conductors is determined from this difference. There is, however, no specification for the features relating to the shape, design and placement of the conductor arrangements in the transport path and on the vehicle floor, which effect the greatest-possible magnetic coupling between the primary and secondary sides with the lowest-possible conductor inductances and the lowest-possible magnetic field intensities scattering into the environment. Rather, the figure illustrates a primary-side and secondary-side arrangement of conductors and coils having compact, square cross sections that are known to have high internal magnetic leakage fluxes and high internal inductances, which do not contribute to the magnetic coupling of the primary conductor arrangement and the secondary coil arrangement.

JP 07-297 058 discloses a power-transmission device that has three parallel primary conductors, specifically a central conductor and two outside conductors, which are laid in one plane, with the total current of an AC-voltage source flowing in one direction in the central conductor and dividing at the end of the primary conductor arrangement into two currents of equal magnitude, which flow back to the source in the two outside conductors. This conductor arrangement impedes the generation of induction currents in a conductor that is not a component of the power-transmission device. This patent application also offers no specification of the shape, design and placement of the conductor arrangements in the transport path and on the vehicle floor, which are intended to attain a large magnetic coupling between the primary and secondary sides with the lowest-possible conductor inductances and the smallest-possible magnetic fields scattering into the environment. While the figures illustrate how the magnetic flux generated by the primary conductors is conducted through the secondary-side winding arrangement comprising one or two coils by differently-shaped cores, these arrangements are, again, exclusively coil-and-conductor arrangement having a compact conductor cross section that has a high internal magnetic leakage flux and a high internal inductance, which do not contribute to the magnetic coupling of the primary conductor arrangement and the secondary coil arrangement. Furthermore, the secondary-side coil arrangements are spaced far from the primary conductor arrangement, and expand considerably in the direction perpendicular to the plane of the primary conductors, which increases the magnetic leakage flux and the inductance of the secondary-side coils without improving the magnetic coupling.

The undesired magnetic leakage fluxes of the conductor arrangements of the prior art not only increase the dimensions and the material requirement for a power-transmission device designed for a specific power, but cause an electromagnetic exposure in the area surrounding the power-transmission device, particularly in devices intended for high transmission powers. Because the magnetic field intensities of this exposure are limited by standards, a transmission device having large magnetic scatter fields can only transmit lower powers than a transmission device in which the shape, design and placement of the conductor arrangements in the transport path and on the vehicle floor keep the magnetic leakage fluxes to a minimum.

It is therefore the object of the invention to provide a power-transmission device that has the greatest-possible magnetic coupling between the primary conductor arrangement laid in a transport path and the secondary winding disposed on a vehicle floor, and in which undesired magnetic leakage fluxes and inductances are minimal.

SUMMARY OF THE INVENTION

The above object generally is accomplished according to the present invention. Advantageous embodiments and modifications of the basic invention are disclosed.

The inventive concept is an electric power-transmission device having a primary conductor arrangement comprising at least two parallel primary conductors and a secondary winding arrangement, which is electromagnetically coupled thereto, is mechanically separate from the primary conductor arrangement and can be moved in its longitudinal direction. According to the invention, the primary conductor arrangement and the secondary winding arrangement comprise flat conductors having a small thickness of a few millimeters and a large width side ($b_L$), the width sides of the primary conductors are disposed adjacently in one plane, and the secondary winding arrangement has at least one secondary coil, which is embodied as a disk winding whose conductor width sides lie in one plane extending parallel to the plane that receives the primary conductor arrangement.

The disk winding is preferably embodied as a ring winding having two parallel, spaced winding segments, with a first winding segment being in the immediate vicinity of a first primary conductor, and a second winding segment being in the immediate vicinity of a further primary conductor, and extending parallel thereto.

In a further preferred embodiment, the primary conductors are embodied as flat conductors whose surface normals extend perpendicular to the plane that receives the secondary winding arrangement.

In a further preferred embodiment, the primary conductor arrangement comprises at least three primary conductors and the secondary winding arrangement comprises at least two secondary coils.

In a further preferred embodiment, winding segments of adjacent secondary coils are associated with a central primary conductor, or a plurality of primary conductors through which current flows in the same direction.

In a further preferred embodiment, at least one ferrite plate is associated with the secondary winding arrangement on at least the side opposite the primary conductor arrangement, and/or at least one ferrite plate is associated with the primary conductor on at least the side opposite the secondary winding arrangement.

In a further preferred embodiment, the secondary winding arrangement is disposed on a vehicle floor. It is particularly advantageous to embed the secondary winding arrangement in a casting compound.

The primary conductor arrangement is preferably immovably fixed near the surface of a transport path. It is advantageous to produce the primary conductor arrangement from litz material.

The essential features of the invention are described in detail below and illustrated in figures.

DESCRIPTION OF THE PREFERRED EMBODIMENT

Figure 1:
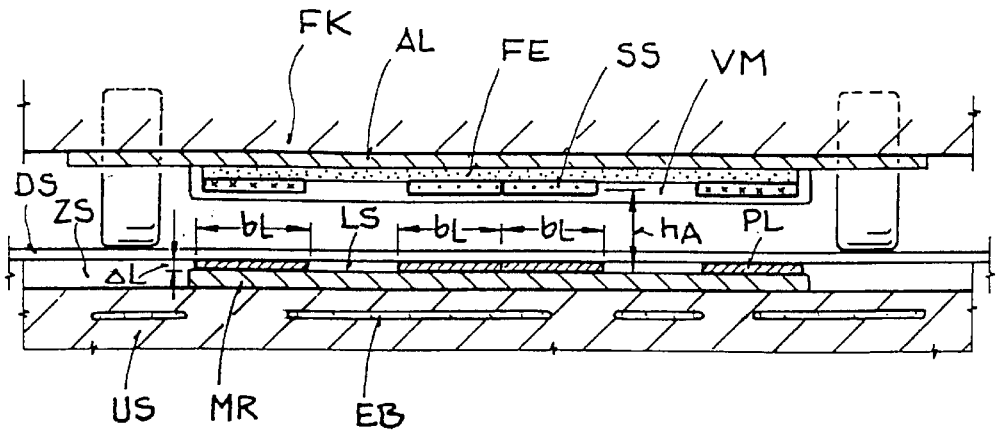
FIG. 1 is a cross-section of a transmitter arrangement of the invention on a vehicle and in the transport path.
Figure 2:
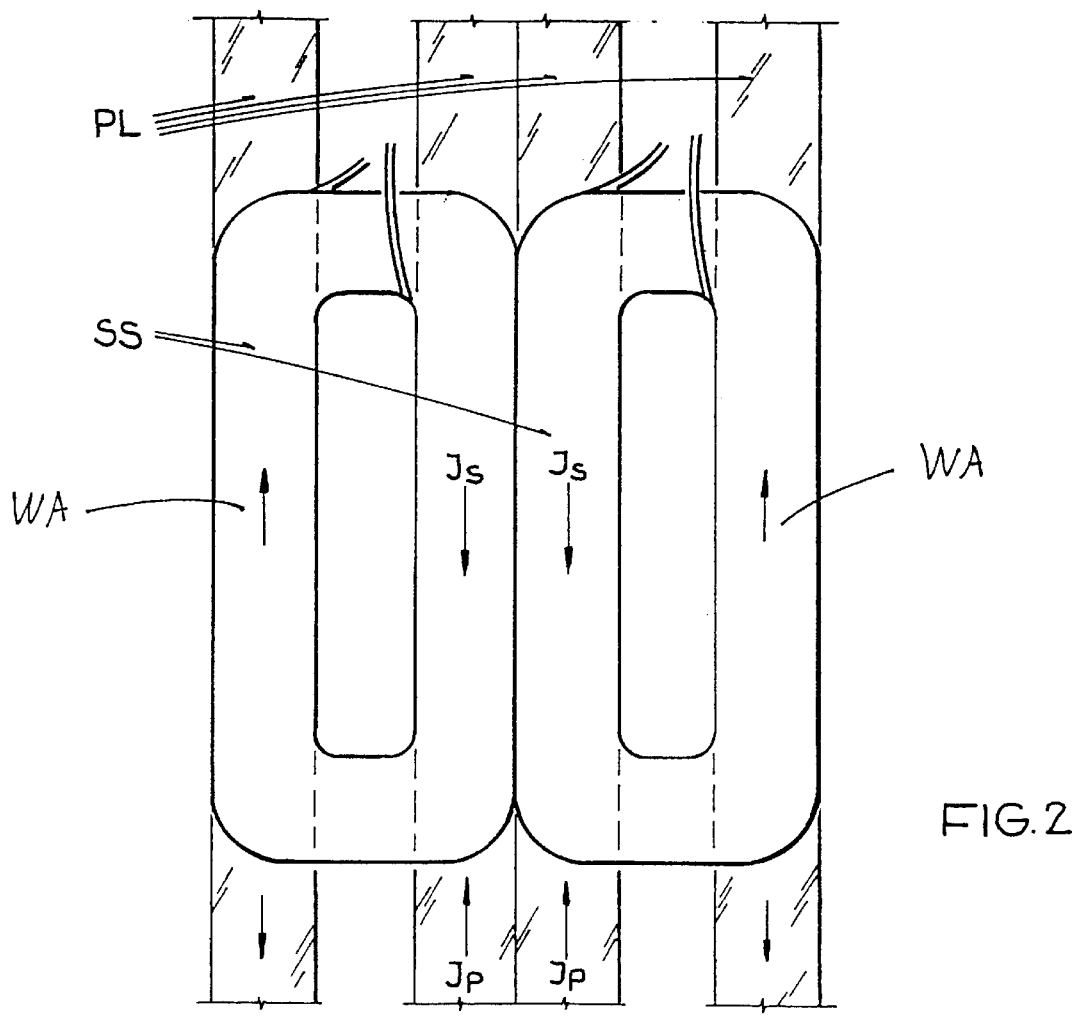
FIG. 2 shows the association of the primary conductors and secondary coils in an arrangement in accordance with the invention

FIG. 1 is a cross-section of a transmitter arrangement whose primary conductors are recessed into the transport path, and whose secondary coils are disposed on the underside of the vehicle body FK. FIG. 2 shows the secondary coils in the optimal alignment to the primary coils.

An aluminum sheet AL shields the floor of the vehicle body (FIG. 1), which typically comprises a steel plate, from the magnetic medium-frequency field emanating from the primary conductors PL laid in the transport path and the secondary coils SS disposed on a ferrite-plate base FE mounted on the vehicle floor. The ferrite-plate support constitutes the magnetic yoke of the secondary transmitter part. It is embedded, with the secondary coils, in a casting compound VM.

FIG. 2 illustrates a double-loop transmitter. It comprises two adjacent conductor loops, through which current flows in opposite directions. The primary and secondary parts are magnetically coupled essentially by the magnetic flux surrounding the adjacent center conductors of both the primary and secondary parts. In principle, a transmitter having only one conductor loop in the primary and secondary parts is also suitable. In comparison to this single-loop transmitter, a better coupling between the primary and secondary sides, and a lower magnetic field intensity scattering into the environment, are anticipated from the double-loop transmitter due to the large center-conductor total width $2 \cdot b_L$, which can be a multiple of twice the distance $2\,h_A$ between the primary conductors and the secondary coils. Comparative studies must include both conductor arrangements, however.

The primary conductors PL recessed into the floor are mechanically protected by a cover layer DS, which is electrically and magnetically non-conductive and can also be the flooring. To avoid current displacement, the primary conductors as well as the secondary coils comprise numerous thin individual wires, which extend at a diagonal in, for example, a braiding over the entire conductor width $b_L$. To attain the lowest-possible conductor inductance and the greatest-possible coupling between the primary and secondary sides, a large conductor width $b_L$ is desired. The primary conductors and the secondary coils therefore have a small conductor thickness $d_L$, which, according to estimate calculations, only reaches a maximum of a few millimeters.

The primary conductors, like the secondary coils, can be supported on a ferrite layer that constitutes the magnetic yoke MR. This arrangement has the advantage of a good magnetic coupling between the primary and secondary parts, but the disadvantage of increased costs of the transmission path and a larger primary-conductor inductance, which must be compensated with higher capacitor costs.

If the lower layer US beneath the primary conductors also comprises an electrically and magnetically non-conductive material, the magnetic yoke in the transport path can be omitted, and the required transmission power for the—now less favorable—magnetic coupling can be provided by an increased primary-conductor current or a larger coil surface. If, in contrast, steel reinforcing EB is present beneath the transmission line, as shown in FIG. 1, a magnetically-conductive shield layer between the transmission conductors and the reinforcement may be necessary to avoid eddy losses.

With the given distance $h_A$, that is, the mechanical play between the resting primary part and the moved secondary part, the gap width effective in the magnetic circuit of the double-layer transmitters is about twice as large as in the transmitter arrangements having transmitter heads that enclose the conductors, even if the primary part also has a magnetic yoke. If the magnetic yoke in the primary part of the double-layer transmitters is omitted, the effective magnetic gap width is significantly larger. Double-layer transmitters therefore generally possess larger dimensions, and require a larger outlay for material.

In the transmission of higher powers with primary-conductor current intensities in the 100-A range, it must be expected that the limit value of the magnetic field intensity, which is specified in the initial standard ENV 50166-2 as acceptable for job-related human exposure, will be exceeded directly by the conductors laid in the floor. Transport paths with greater exposure can therefore only be traversed to a limited extent. With lower transmission powers, it is possible to utilize large transmission surfaces to keep the current intensity in the transmission lines so low that the field intensities at the conductor surface are less than 100 A/m with large conductor widths $b_L$. With these prerequisites in mind, it can be assumed that, in the frequency range of 10 kHz to 38 kHz, the field intensities, which decrease dramatically with the distance from the conductor arrangement, do not exceed the limit value of 42 A/m specified in ENV 50166-2 as acceptable for job-related human exposure.

An advantageous, inexpensive shielding measure for reducing eddy losses into the reinforcements located directly beneath the primary-side flat conductors is an intermediate layer ZS comprising ferrite waste in a binding material.

A back-up battery on moving systems having high power peaks advantageously permits the design of the power-transmission systems for the mean power, which is significantly lower than the peak power. This also considerably reduces the magnetic field intensities in the area surrounding the transmission conductors. Because the battery is continuously recharged, the necessary battery capacity is much smaller than in a vehicle that is exclusively battery-operated over a lengthy period of time. A further advantage of the back-up battery is the increased maneuverability of the vehicle. Because it is expected that a battery-supported transmission system is the optimum solution in terms of operation and costs, at least with dramatic load fluctuations, a system concept of this variation should be created and compared to an unsupported system.

An especially advantageous possible application for inductive power transmission via flat conductors laid in the transport path is unmanned transport systems for vehicle assembly, because such vehicles require total powers in the range of a few kW, of which about one-half is necessary for the driving-power requirement. At the same time, a floor surface area of more than 2 m² can be useful for transmitting power. The leeway in the floor design of the vehicle has a strong impact on the attainable gap width.

What is claimed is:

1. An electric power-transmission device having a primary conductor arrangement comprising at least two parallel primary conductors and at least one secondary winding arrangement, which is electromagnetically coupled thereto, is mechanically separate from the primary conductor arrangement and can be moved in its longitudinal direction, and wherein:

the primary conductor arrangement and the secondary winding arrangement comprise flat conductors having a small thickness of a few millimeters and a large width side;

the width sides of the primary conductors are disposed adjacently in one plane; and, the secondary winding arrangement has at least one secondary coil that is embodied as a disk winding whose conductor width sides lie in one plane that extends parallel to the plane of the primary conductor arrangement.

2. The power-transmission device according to claim 1, wherein the device is a double-loop transmitter with a primary conductor arrangement having two adjacent conductor loops through which current flows in opposite directions.

3. The power-transmission device according to claim 1, wherein, on the side facing away from the primary conductor arrangement, the secondary winding arrangement has a magnetic yoke comprising ferrite.

4. The power-transmission device according to claim 3, wherein the magnetic yoke comprises a ferrite-plate base on which the at least one secondary coil is disposed.

5. The power-transmission device according to claim 1, wherein the primary conductor arrangement comprises at least three primary conductors, and the secondary winding arrangement comprises at least two adjacent secondary coils that are located approximately centrally opposite the primary conductor arrangement.

6. The power-transmission device according to claim 1, wherein the device includes at least two of said secondary coils that are embodied as respective disk windings and that have two spaced, parallel, straight winding segments (WA), which are located opposite a pair of parallel primary conductors.

7. The power-transmission device according to claim 1, wherein the primary conductor arrangement comprises one of a three conductor arrangement with a central conductor of the primary conductor arrangement possessing substantially the same conductor width of the two adjacent primary conductors, and two adjacent primary conductors of the same width through which current flows in the same direction; and, the primary conductor arrangement and the secondary winding arrangement have approximately the same conductor width and the same total width.

8. The power-transmission device according to claim 7, wherein the conductor widths of the primary conductor arrangement and the secondary winding arrangement are selected such that one of the width of the central conductor and the total width of the secondary coils lying adjacently in the center of the secondary winding arrangement, is about equal to or greater than twice the distance between the respective planes of the primary and secondary winding arrangements.

9. The power-transmission device according to claim 1, wherein the primary conductors and the secondary coils comprise numerous thin individual wires that extend at a diagonal over the entire conductor width in a braiding.

10. The power-transmission device according to claim 1, wherein the secondary winding arrangement is disposed on the underside of a vehicle floor.

11. The power-transmission device according to claim 10, wherein an aluminum sheet is disposed between a magnetic yoke of the secondary winding arrangement and the underside of a vehicle floor.

12. The power-transmission device according to claim 1, wherein the secondary winding arrangement is embedded in a casting compound.

13. The power-transmission device according to claim 1, wherein the primary conductor arrangement is immovably fixed near the surface of a transport path.

14. The power-transmission device according to claim 1, wherein a magnetic yoke is disposed beneath the primary conductor arrangement and comprises ferrite waste.

15. The power-transmission device according to claim 1, further comprising a back-up battery connected to the secondary winding arrangement.

* * * * *